United States Patent [19]
Babiel et al.

[11] Patent Number: 5,298,101
[45] Date of Patent: Mar. 29, 1994

[54] METHOD OF WELDING TOGETHER CABLE INSULATION

[75] Inventors: Gerhard Babiel, Moers; Thomas Brenken, Mülheim; Dieter Kühnold, Herten, all of Fed. Rep. of Germany

[73] Assignee: Telefunken Kabelsatz GmbH, Frankfurt am Main, Fed. Rep. of Germany

[21] Appl. No.: 823,537

[22] Filed: Jan. 21, 1992

[30] Foreign Application Priority Data

Jan. 22, 1991 [DE] Fed. Rep. of Germany ....... 4101663

[51] Int. Cl.⁵ ............................................. B29C 65/22
[52] U.S. Cl. .................................. 156/273.9; 156/282; 156/296
[58] Field of Search ...................... 156/47, 274.2, 273.9, 156/296, 282; 174/117 R, 117 F, 117 FF; 219/522, 544, 549

[56] References Cited
U.S. PATENT DOCUMENTS 2,425,294  8/1947  Morgan .................................. 156/47
2,489,867  11/1949  D'Orio .............................. 156/274.2

*Primary Examiner*—Michael W. Ball
*Assistant Examiner*—Steven D. Maki
*Attorney, Agent, or Firm*—Spencer, Frank & Schneider

[57] ABSTRACT

A method of welding together cable insulations of cables having cores insulated by sheaths of polymeric insulation material capable of at least softening when heated, the method including electrically connecting the cores of the cables to be joined; heating the cable insulations by passing a current through the cores of the electrically connected cables effective to provide Joule heating sufficient to cause the cable insulations to at least soften; and pressing the heated cable insulations together with a pressure sufficient to cause the heated cable insulations to weld together.

12 Claims, 1 Drawing Sheet

METHOD OF WELDING TOGETHER CABLE INSULATION

CROSS-REFERENCE TO RELATED APPLICATION

This Application claims the priority of Application No. P 41 01 663.7 filed Jan. 22, 1991 in Germany, the subject matter of which is incorporated herein by reference.

BACKGROUND OF THE INVENTION

1. Field of the Invention.

The present invention relates to a method of welding together cable insulation of electrical cables, conduits, leads, and the like insulated by sheaths of polymeric insulation material. After the metal cores of the cable ends have been electrically connected by pressure contacting, welding, soldering, and the like, the insulations are heated and pressed together so that the cable insulations melt into one another.

2. Background of the Art

In the past, it has been the custom to heat cables whose insulations were to be welded, i.e., joined, together and then to press them together so that the polymeric sheaths would weld together at the points of contact. The cable sheaths were heated, for example, by means of a known butt welding method.

Due to the separate heating of the individual cables, however, positioning of the cables after heating is not reliably reproducible during the subsequent pressing process. The insulating may very easily be damaged. Moreover, the time available to press the cables together is limited so that the danger exists that so much time is used for positioning that the cable sheaths cool to such an extent that reliable welding is no longer ensured.

SUMMARY OF THE INVENTION

It is therefore an object of the present invention to provide a method of the above-mentioned type in which the cables can be positioned reliably and a reproducible welding result can be obtained.

This object is accomplished by the present invention by providing a method of welding together cable insulations of cables having cores insulated by sheaths of polymeric insulation material capable of at least softening when heated, the method including electrically connecting the cores of the cables to be joined, heating the cable insulations by passing a current through the cores of the electrically connected cables effective to provide Joule heating sufficient to cause the cable insulations to at least soften, and pressing the heated cable insulations together with a pressure sufficient to cause the heated cable insulations to weld together. Preferably, the cable insulation melts during heating at least at the points of contract where welding is desired. The inventive method is useful, for example, for welding together sets of battery cables for motor vehicles.

The inventive method preferably further comprises compressing the cable insulations of the electrically connected cables in a pressing tool before and during heating so that heating and pressing take place simultaneously. Preferably, the inventive method further comprises cooling the cable insulations in zones thereof which are not to be welded together. Cooling may be effected by means of contact with a molding tool which is preferably metal, by means of contact with a fluid, such as water or a cooling oil. When pressing takes place in a metal molding tool, cooling may be effected by means of a fluid around the metal molding tool and the cable. This can be achieved by dipping the complete tool into a basin containing the cooling fluid, for example, a water basin.

The Joule heating may be effected by means of pulsed electrical current, direct current, low-frequency electrical current, or high-frequency electrical current. Pulserates and frequencies suitable for Joule heating are known in the art. Suitable frequency electrical current ranges from 0 Hz to 10 GH, that means from DC current up to microwave current.

The present invention has the particular advantage that cables and cable harnesses produced in this manner are very form stable. Moreover, the exterior regions of a cable sheaths remain practically undeformed in the preferred embodiment in which the resulting Joule heat is dissipated into the environment by cooling means, such as a cooling device. Thus the heat becomes effective only at those locations wherein it is desired that the cable sheaths weld together. The cooling device may be a water basin or a surrounding metal tool that reflects the desired shape for the cable harness.

As used herein, the term "welding" of insulations is intended to mean "joining" of polymeric insulation material by heat and pressure. Heat is applied which is sufficient to at least soften the polymeric insulation materials so that subsequent application of pressure serves to cause the materials to join together and adhere. Preferably, the application of heat melts the polymeric insulation materials so that application of pressure causes the polymeric insulation materials to flow together and be joined.

BRIEF DESCRIPTION OF THE DRAWINGS

The invention will now be described in greater detail with reference to the attached drawing figures in which.

DESCRIPTION OF THE PREFERRED EMBODIMENTS

Figure 1:
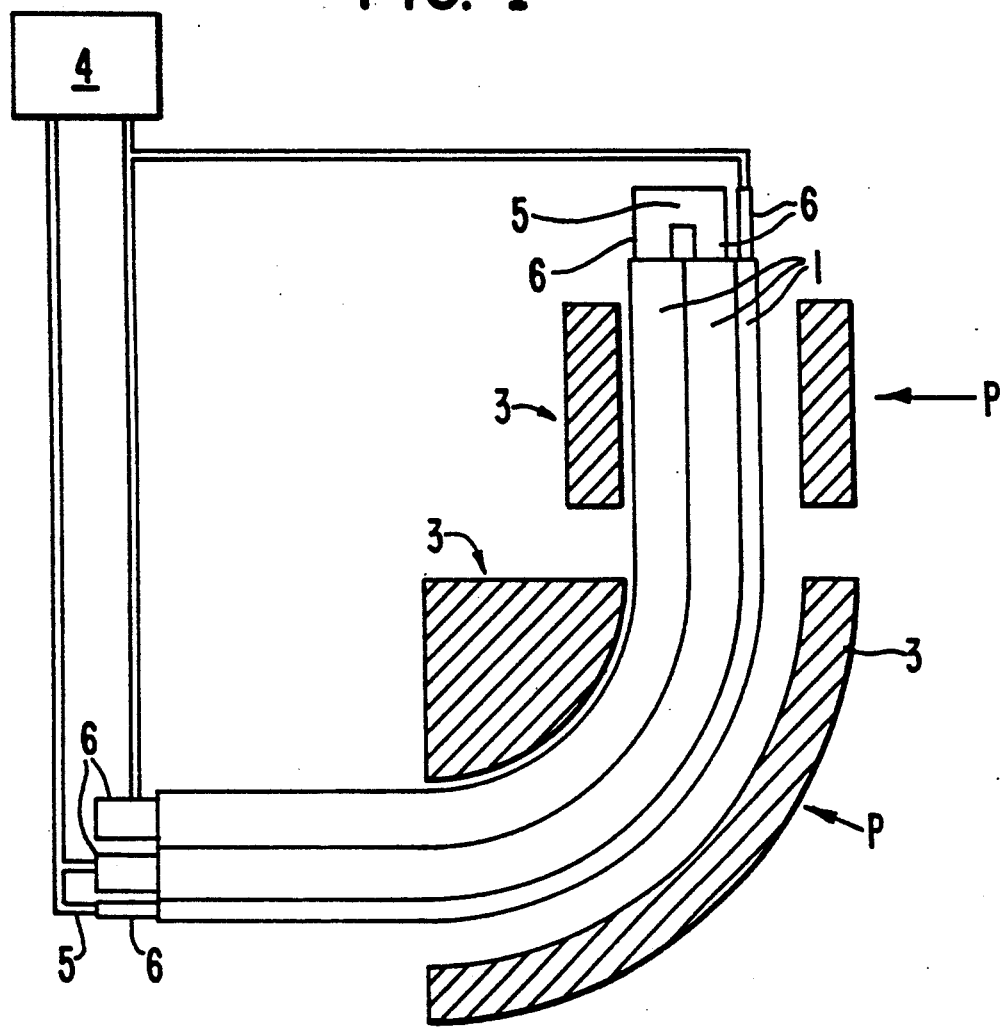
FIG. 1 is a schematic representation of an apparatus suitable for practicing the inventive method.
Figure 2:
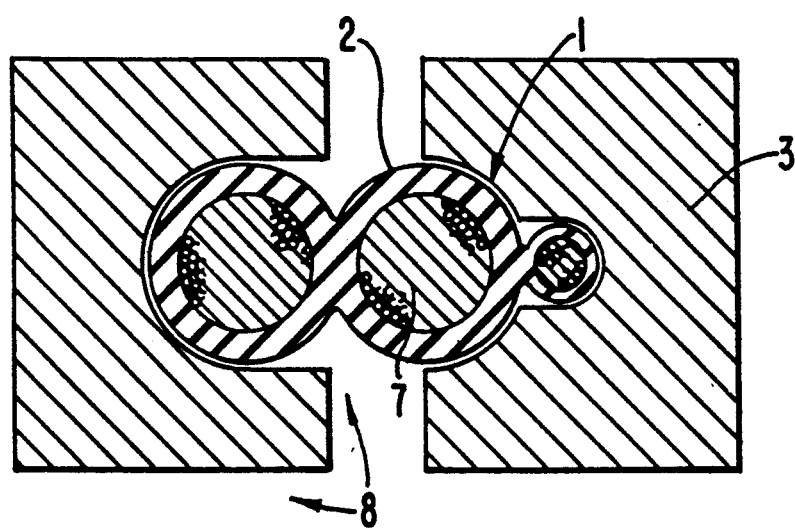
FIG. 2 is a cross-sectional view of a set of cables and a pressing mold useful in practicing the inventive method.

For welding together cables, cables 1 are initially placed parallel to one another in metal molding tool 3, shown as mold 3 in FIG. I. The cavities or grooves provided in mold 3 and shown in FIG. 2 hold the individual cables 1 together and position them as the individual mold components are moved together and a contact pressure P is exerted onto the mold 3 as shown in FIG. 1. Then, cores 7 of cables I are electrically connected with one another and with a mains unit 4 which supplies the required electrical power as shown in FIG. 1.

The insulation 2 of each cable I is in contact either with the insulation of another cable or with a cooling means, such as a cooling fluid or the metal mold 3 itself. For that reason, only the point of contact between the insulations of the individual cables 1 is heated and melts together. Advisably, after the mold components have been brought together, the entire unit (molds, cables, terminals) is lowered into a bath of water. The current will be switched on to heat up the copper wire and thereby heating up the insulation. After heating the latter up to the melting point, the whole device stays in the bath of water until it is cooled down to room temperature.

While the present invention contemplates that cables may be connected by simple abutting of cable ends in which the metal cords or wires are electrically connected by welding or soldering and the like, followed by joining together of the polymeric insulation materials, FIG. 1 shows a preferred embodiment in which the cable 1 are provided with cable shoes 6, for example, for the connection to an automobile battery or to a lead. As shown in FIG. 1, these cable shoes 6 are connected by means of shorting bars 5 with the mains unit 4 or with one another. The mains unit 4 furnishes, for example, up to 1,000 A at 50 Hz. The current is conducted through the cables 1 until the insulation material melts at the points of contact. The remaining surface of the insulation 2 is cooled by means of oil or water 8 so that the surface temperature of these zones is unable to reach the melting point of the insulation material.

A particular advantage of this method is that welding, i.e., heating and pressing, can be performed in one process step and the finished product can be made to permanently take on a predetermined shape, for example, a 90° arc, so that a geometry suitable for installation can be imparted when the set of cables is manufactured.

The method can be used for all polymeric cable insulations. No difficulties whatsoever arise, for example, with insulation material composed of PVC (polyvinyl chloride) or rubber. Even with conduits that are insulated by a polyimide, it is possible to reach the melting point and weld the cables together. In such a case, however, a silicone oil, for example, is employed as the coolant.

EXAMPLE 1

As a specific example, leads insulated with polyamide were welded together according to the inventive method. The leads were placed into a mold, heated, and compressed with a force of 100N per cm of cable length. Thus, a pressure of about 1,000N/cm$^2$ was required to compress the insulation over a width of 1 mm. If the softening temperature is increased, less pressure is of course required. The exact values must, of course, be experimentally determined for each individual type of insulation material. However, it is generally advantageous to employ a higher pressure and a lower temperature to obtain an optimum welding result.

It will be understood that the above description of the present invention is susceptible to various modifications, changes and adaptations, and the same are intended to be comprehended within the meaning and range of equivalents of the appended claims.

What is claimed is:

1. A method of welding together selected portions of cable insulation of a plurality of cables having cores insulated by a sheath of insulation material which is polymeric and which is capable of at least softening when heated, the method comprising, in the order recited:
    a. placing a plurality of cables to be joined in a molding tool;
    b. electrically connecting the cores of the plurality of cables to be joined;
    c. immersing the plurality of cables and the molding tool in a cooling bath;
    d. heating the cable insulations by passing a current through the cores of the electrically connected plurality of cables effective to provide Joule heating sufficient to cause at least the selected portions of cable insulation to at least soften; and
    e. pressing at least the selected portions of cable insulation together during heating with a pressure sufficient to cause the selected portions of cable insulation to join together.

2. The method according to claim 1, wherein the molding tool is metal and wherein the method further comprises cooling the cable insulations in zones other than the selected portions to be joined together by contact with a liquid which is one of water and an oil.

3. The method according to claim 1, wherein the Joule heating is effected by means of an electrical current which is selected from the group consisting of direct, pulsed, low-frequency and high-frequency electrical current.

4. A method of welding together cable insulations of a plurality of cables having cores insulated by sheaths of polymeric insulation material capable of at least softening when heated, the method comprising, in the order recited:
    a. electrically connecting the cores of the plurality of cables to be joined;
    b. placing the plurality of cables parallel to one another and in contact with one another in a mold;
    c. immersing the mold in a cooling bath filled with a fluid which is one of oil and water;
    d. heating the cable insulations by passing a current through the cores of the electrically connected cables effective to provide Joule heating sufficient to cause the cable insulations to at least soften;
    e. pressing the heating cable insulations together in the mold with a pressure sufficient to cause the heated cable insulations to weld together; and
    f. cooling the mold and the welded cables to room temperature in the cooling bath.

5. The method according to claim 1, further comprising compressing the cable insulations of the electrically connected cables in a pressing tool before and during heating so that heating and pressing take place simultaneously.

6. The method according to claim 1, further comprising cooling the cable insulations in zones thereof which are not to be welded together.

7. The method according to claim 6, where cooling is effected by means of water or oil.

8. The method according to claim 6, wherein pressing takes place in a metal molding tool, and wherein cooling is effected by means of a fluid within the metal molding tool.

9. The method according to claim 1, wherein heating is effected by means of a pulsed electrical current.

10. The method according to claim 1, wherein heating is effected by means of a low-frequency electrical current.

11. The method according to claim 1, wherein heating is effected by means of a high-frequency electrical current.

12. The method according to claim 1, wherein heating is effected by means of a direct current.

* * * * *